United States Patent
Tarra et al.

(10) Patent No.: US 8,477,793 B2
(45) Date of Patent: Jul. 2, 2013

(54) MEDIA STREAMING DEVICE WITH GATEWAY FUNCTIONALITY

(75) Inventors: Raghuveer Tarra, Cupertino, CA (US); Parimal Bajpai, Bangalore (IN); Sharath Hariharpur Satheesh, Bangalore (IN)

(73) Assignee: Sling Media, Inc., Foster City, CA (US)

(*) Notice: Subject to any disclaimer, the term of this patent is extended or adjusted under 35 U.S.C. 154(b) by 385 days.

(21) Appl. No.: 12/237,103

(22) Filed: Sep. 24, 2008

(65) Prior Publication Data
US 2009/0080448 A1 Mar. 26, 2009

Related U.S. Application Data

(60) Provisional application No. 60/975,239, filed on Sep. 26, 2007.

(51) Int. Cl.
*H04L 12/56* (2006.01)
*H04L 29/02* (2006.01)

(52) U.S. Cl.
USPC .......................................... 370/401; 370/252

(58) Field of Classification Search
USPC ........ 370/252, 401, 412; 707/104.1; 709/222; 711/151
See application file for complete search history.

(56) References Cited

U.S. PATENT DOCUMENTS

| | | | |
|---|---|---|---|
| 3,416,043 A | 12/1968 | Jorgensen | |
| 4,254,303 A | 3/1981 | Takizawa | |
| 5,161,021 A | 11/1992 | Tsai | |
| 5,237,648 A | 8/1993 | Mills et al. | |
| 5,386,493 A | 1/1995 | Degen et al. | |
| 5,434,590 A | 7/1995 | Dinwiddie, Jr. et al. | |
| 5,493,638 A | 2/1996 | Hooper et al. | |
| 5,602,589 A | 2/1997 | Vishwanath et al. | |
| 5,661,516 A | 8/1997 | Carles | |
| 5,666,426 A | 9/1997 | Helms | |
| 5,682,195 A | 10/1997 | Hendricks et al. | |

(Continued)

FOREIGN PATENT DOCUMENTS

| | | |
|---|---|---|
| CN | 1464685 | 12/2003 |
| DE | 4407319 A1 | 9/1994 |

(Continued)

OTHER PUBLICATIONS

USPTO, Final Office Action, mailed Nov. 6, 2009; U.S. Appl. No. 09/809,868, filed Mar. 15, 2001.

(Continued)

*Primary Examiner* — Marsha D Banks Harold
*Assistant Examiner* — Matthew Campbell
(74) *Attorney, Agent, or Firm* — Ingrassia Fisher & Lorenz, P.C.

(57) ABSTRACT

Various methods and devices provide place shifting of a media stream to a remote device while also providing network functionality for a local area network (LAN) and/or a wide area network (WAN). The gateway includes a media interface for receiving audio/visual (A/V) signals from the media source, as well as interfaces to the LAN and/or the WAN. A media streaming module receives the A/V signals from the media interface and processes the received A/V signals to thereby create the media stream. A modem module receives the media stream from the media streaming module via a dedicated connection, network switch and/or other connection, and transmits the media stream to the remote device via at least one of the first and second network interfaces.

16 Claims, 2 Drawing Sheets

U.S. PATENT DOCUMENTS

| | | |
|---|---|---|
| 5,706,290 A | 1/1998 | Shaw et al. |
| 5,708,961 A | 1/1998 | Hylton et al. |
| 5,710,605 A | 1/1998 | Nelson |
| 5,722,041 A | 2/1998 | Freadman |
| 5,757,416 A | 5/1998 | Birch et al. |
| 5,774,170 A | 6/1998 | Hite et al. |
| 5,778,077 A | 7/1998 | Davidson |
| 5,794,116 A | 8/1998 | Matsuda et al. |
| 5,822,537 A | 10/1998 | Katseff et al. |
| 5,831,664 A | 11/1998 | Wharton et al. |
| 5,850,482 A | 12/1998 | Meany et al. |
| 5,852,437 A | 12/1998 | Wugofski et al. |
| 5,880,721 A | 3/1999 | Yen |
| 5,898,679 A | 4/1999 | Brederveld et al. |
| 5,909,518 A | 6/1999 | Chui |
| 5,911,582 A | 6/1999 | Redford et al. |
| 5,922,072 A | 7/1999 | Hutchinson et al. |
| 5,936,968 A | 8/1999 | Lyons |
| 5,968,132 A | 10/1999 | Tokunaga |
| 5,987,501 A | 11/1999 | Hamilton et al. |
| 6,002,450 A | 12/1999 | Darbee et al. |
| 6,008,777 A | 12/1999 | Yiu |
| 6,014,694 A | 1/2000 | Aharoni et al. |
| 6,020,880 A | 2/2000 | Naimpally |
| 6,031,940 A | 2/2000 | Chui et al. |
| 6,036,601 A | 3/2000 | Heckel |
| 6,040,829 A | 3/2000 | Croy et al. |
| 6,043,837 A | 3/2000 | Driscoll, Jr. et al. |
| 6,049,671 A | 4/2000 | Slivka et al. |
| 6,075,906 A | 6/2000 | Fenwick et al. |
| 6,088,777 A | 7/2000 | Sorber |
| 6,097,441 A | 8/2000 | Allport |
| 6,104,334 A | 8/2000 | Allport |
| 6,108,041 A | 8/2000 | Faroudja et al. |
| 6,115,420 A | 9/2000 | Wang |
| 6,117,126 A | 9/2000 | Appelbaum et al. |
| 6,141,059 A | 10/2000 | Boyce et al. |
| 6,141,447 A | 10/2000 | Linzer et al. |
| 6,160,544 A | 12/2000 | Hayashi et al. |
| 6,201,536 B1 | 3/2001 | Hendricks et al. |
| 6,212,282 B1 | 4/2001 | Mershon |
| 6,222,885 B1 | 4/2001 | Chaddha et al. |
| 6,223,211 B1 | 4/2001 | Hamilton et al. |
| 6,240,459 B1 | 5/2001 | Roberts et al. |
| 6,240,531 B1 | 5/2001 | Spilo et al. |
| 6,243,596 B1 | 6/2001 | Kikinis |
| 6,256,019 B1 | 7/2001 | Allport |
| 6,263,503 B1 | 7/2001 | Margulis |
| 6,279,029 B1 | 8/2001 | Sampat et al. |
| 6,282,714 B1 | 8/2001 | Ghori et al. |
| 6,286,142 B1 | 9/2001 | Ehreth |
| 6,310,886 B1 | 10/2001 | Barton |
| 6,340,994 B1 | 1/2002 | Margulis et al. |
| 6,353,885 B1 | 3/2002 | Herzi et al. |
| 6,356,945 B1 | 3/2002 | Shaw et al. |
| 6,357,021 B1 | 3/2002 | Kitagawa et al. |
| 6,370,688 B1 | 4/2002 | Hejna, Jr. |
| 6,389,467 B1 | 5/2002 | Eyal |
| 6,434,113 B1 | 8/2002 | Gubbi |
| 6,442,067 B1 | 8/2002 | Chawla et al. |
| 6,456,340 B1 | 9/2002 | Margulis |
| 6,466,623 B1 | 10/2002 | Youn et al. |
| 6,470,378 B1 | 10/2002 | Tracton et al. |
| 6,476,826 B1 | 11/2002 | Plotkin et al. |
| 6,487,319 B1 | 11/2002 | Chai |
| 6,493,874 B2 | 12/2002 | Humpleman |
| 6,496,122 B2 | 12/2002 | Sampsell |
| 6,505,169 B1 | 1/2003 | Bhagavath et al. |
| 6,510,177 B1 | 1/2003 | De Bonet et al. |
| 6,529,506 B1 | 3/2003 | Yamamoto et al. |
| 6,553,147 B2 | 4/2003 | Chai et al. |
| 6,557,031 B1 | 4/2003 | Mimura et al. |
| 6,564,004 B1 | 5/2003 | Kadono |
| 6,567,984 B1 | 5/2003 | Allport |
| 6,584,201 B1 | 6/2003 | Konstantinou et al. |
| 6,584,559 B1 | 6/2003 | Huh et al. |
| 6,597,375 B1 | 7/2003 | Yawitz |
| 6,598,159 B1 | 7/2003 | McAlister et al. |
| 6,600,838 B2 | 7/2003 | Chui |
| 6,609,253 B1 | 8/2003 | Swix et al. |
| 6,611,530 B1 | 8/2003 | Apostolopoulos |
| 6,628,716 B1 | 9/2003 | Tan et al. |
| 6,642,939 B1 | 11/2003 | Vallone et al. |
| 6,647,015 B2 | 11/2003 | Malkemes et al. |
| 6,658,019 B1 | 12/2003 | Chen et al. |
| 6,665,751 B1 | 12/2003 | Chen et al. |
| 6,665,813 B1 | 12/2003 | Forsman et al. |
| 6,697,356 B1 | 2/2004 | Kretschmer et al. |
| 6,701,380 B2 | 3/2004 | Schneider et al. |
| 6,704,678 B2 | 3/2004 | Minke et al. |
| 6,704,847 B1 * | 3/2004 | Six et al. ................. 711/151 |
| 6,708,231 B1 | 3/2004 | Kitagawa |
| 6,718,551 B1 | 4/2004 | Swix et al. |
| 6,754,266 B2 | 6/2004 | Bahl et al. |
| 6,754,439 B1 | 6/2004 | Hensley et al. |
| 6,757,851 B1 | 6/2004 | Park et al. |
| 6,757,906 B1 | 6/2004 | Look et al. |
| 6,766,376 B2 | 7/2004 | Price |
| 6,768,775 B1 | 7/2004 | Wen et al. |
| 6,771,828 B1 | 8/2004 | Malvar |
| 6,774,912 B1 | 8/2004 | Ahmed et al. |
| 6,781,601 B2 | 8/2004 | Cheung |
| 6,785,700 B2 | 8/2004 | Masud et al. |
| 6,795,638 B1 | 9/2004 | Skelley, Jr. |
| 6,798,838 B1 | 9/2004 | Ngo |
| 6,806,909 B1 | 10/2004 | Radha et al. |
| 6,807,308 B2 | 10/2004 | Chui et al. |
| 6,816,194 B2 | 11/2004 | Zhang et al. |
| 6,816,858 B1 | 11/2004 | Coden et al. |
| 6,826,242 B2 | 11/2004 | Ojard et al. |
| 6,834,123 B2 | 12/2004 | Acharya et al. |
| 6,839,079 B2 | 1/2005 | Barlow et al. |
| 6,847,468 B2 | 1/2005 | Ferriere |
| 6,850,571 B2 | 2/2005 | Tardif |
| 6,850,649 B1 | 2/2005 | Malvar |
| 6,868,083 B2 | 3/2005 | Apostolopoulos et al. |
| 6,889,385 B1 | 5/2005 | Rakib et al. |
| 6,892,359 B1 | 5/2005 | Nason et al. |
| 6,898,583 B1 | 5/2005 | Rising, III |
| 6,907,602 B2 | 6/2005 | Tsai et al. |
| 6,927,685 B2 | 8/2005 | Wathen |
| 6,930,661 B2 | 8/2005 | Uchida et al. |
| 6,941,575 B2 | 9/2005 | Allen |
| 6,944,880 B1 | 9/2005 | Allen |
| 6,952,595 B2 | 10/2005 | Ikedo et al. |
| 6,981,050 B1 | 12/2005 | Tobias et al. |
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,110,558 B1 | 9/2006 | Elliott |
| 7,124,366 B2 | 10/2006 | Foreman et al. |
| 7,151,575 B1 | 12/2006 | Landry et al. |
| 7,155,734 B1 | 12/2006 | Shimomura et al. |
| 7,155,735 B1 | 12/2006 | Ngo et al. |
| 7,184,433 B1 | 2/2007 | Oz |
| 7,224,323 B2 | 5/2007 | Uchida et al. |
| 7,239,800 B2 | 7/2007 | Bilbrey |
| 7,344,084 B2 | 3/2008 | DaCosta |
| 7,430,686 B1 | 9/2008 | Wang et al. |
| 7,464,396 B2 | 12/2008 | Hejna, Jr. |
| 7,502,733 B2 | 3/2009 | Andrsen et al. |
| 7,505,480 B1 | 3/2009 | Zhang et al. |
| 7,565,681 B2 | 7/2009 | Ngo et al. |
| 2001/0021998 A1 | 9/2001 | Margulis |
| 2002/0004839 A1 | 1/2002 | Wine et al. |
| 2002/0010925 A1 | 1/2002 | Kikinis |
| 2002/0012530 A1 | 1/2002 | Bruls |
| 2002/0031333 A1 | 3/2002 | Mano et al. |
| 2002/0046404 A1 | 4/2002 | Mizutani |
| 2002/0053053 A1 | 5/2002 | Nagai et al. |
| 2002/0080753 A1 | 6/2002 | Lee |
| 2002/0090029 A1 | 7/2002 | Kim |
| 2002/0105529 A1 | 8/2002 | Bowser et al. |
| 2002/0112247 A1 | 8/2002 | Horner et al. |
| 2002/0122137 A1 | 9/2002 | Chen et al. |
| 2002/0131497 A1 | 9/2002 | Jang |

| | | | |
|---|---|---|---|
| 2002/0138843 A1 | 9/2002 | Samaan et al. | |
| 2002/0143973 A1 | 10/2002 | Price | |
| 2002/0147634 A1 | 10/2002 | Jacoby et al. | |
| 2002/0147687 A1 | 10/2002 | Breiter et al. | |
| 2002/0167458 A1 | 11/2002 | Baudisch et al. | |
| 2002/0188818 A1 | 12/2002 | Nimura et al. | |
| 2002/0191575 A1 | 12/2002 | Kalavade et al. | |
| 2003/0001880 A1 | 1/2003 | Holtz et al. | |
| 2003/0028873 A1 | 2/2003 | Lemmons | |
| 2003/0065915 A1 | 4/2003 | Yu et al. | |
| 2003/0093260 A1 | 5/2003 | Dagtas et al. | |
| 2003/0095791 A1 | 5/2003 | Barton et al. | |
| 2003/0115167 A1 | 6/2003 | Sharif et al. | |
| 2003/0159143 A1 | 8/2003 | Chan | |
| 2003/0187657 A1 | 10/2003 | Erhart et al. | |
| 2003/0192054 A1 | 10/2003 | Birks et al. | |
| 2003/0208612 A1 | 11/2003 | Harris et al. | |
| 2003/0231621 A1 | 12/2003 | Gubbi et al. | |
| 2004/0003406 A1 | 1/2004 | Billmaier | |
| 2004/0052216 A1* | 3/2004 | Roh | 370/252 |
| 2004/0068334 A1 | 4/2004 | Tsai et al. | |
| 2004/0083301 A1 | 4/2004 | Murase et al. | |
| 2004/0100486 A1 | 5/2004 | Flamini et al. | |
| 2004/0103340 A1 | 5/2004 | Sundareson et al. | |
| 2004/0139047 A1 | 7/2004 | Rechsteiner et al. | |
| 2004/0162845 A1 | 8/2004 | Kim et al. | |
| 2004/0162903 A1 | 8/2004 | Oh | |
| 2004/0172410 A1 | 9/2004 | Shimojima et al. | |
| 2004/0205830 A1 | 10/2004 | Kaneko | |
| 2004/0212640 A1 | 10/2004 | Mann et al. | |
| 2004/0216173 A1 | 10/2004 | Horoszowski et al. | |
| 2004/0236844 A1 | 11/2004 | Kocherlakota | |
| 2004/0255249 A1 | 12/2004 | Chang et al. | |
| 2005/0021398 A1 | 1/2005 | McCleskey et al. | |
| 2005/0027821 A1 | 2/2005 | Alexander et al. | |
| 2005/0038981 A1 | 2/2005 | Connor et al. | |
| 2005/0044058 A1 | 2/2005 | Matthews et al. | |
| 2005/0050462 A1 | 3/2005 | Whittle et al. | |
| 2005/0053356 A1 | 3/2005 | Mate et al. | |
| 2005/0055595 A1 | 3/2005 | Frazer et al. | |
| 2005/0060759 A1 | 3/2005 | Rowe et al. | |
| 2005/0097542 A1 | 5/2005 | Lee | |
| 2005/0114852 A1 | 5/2005 | Chen et al. | |
| 2005/0132351 A1 | 6/2005 | Randall et al. | |
| 2005/0138560 A1 | 6/2005 | Lee et al. | |
| 2005/0198584 A1 | 9/2005 | Matthews et al. | |
| 2005/0204046 A1 | 9/2005 | Watanabe | |
| 2005/0216851 A1 | 9/2005 | Hull et al. | |
| 2005/0227621 A1 | 10/2005 | Katoh | |
| 2005/0229118 A1 | 10/2005 | Chiu et al. | |
| 2005/0237434 A1* | 10/2005 | Takatori et al. | 725/100 |
| 2005/0246369 A1 | 11/2005 | Oreizy et al. | |
| 2005/0251833 A1 | 11/2005 | Schedivy | |
| 2005/0283791 A1 | 12/2005 | McCarthy et al. | |
| 2005/0288999 A1 | 12/2005 | Lerner et al. | |
| 2006/0011371 A1 | 1/2006 | Fahey | |
| 2006/0031381 A1 | 2/2006 | Van Luijt et al. | |
| 2006/0050970 A1 | 3/2006 | Gunatilake | |
| 2006/0051055 A1 | 3/2006 | Ohkawa | |
| 2006/0095401 A1 | 5/2006 | Krikorian et al. | |
| 2006/0095471 A1 | 5/2006 | Krikorian et al. | |
| 2006/0095472 A1* | 5/2006 | Krikorian et al. | 707/104.1 |
| 2006/0095942 A1 | 5/2006 | Van Beek | |
| 2006/0095943 A1 | 5/2006 | Demircin et al. | |
| 2006/0107226 A1 | 5/2006 | Matthews et al. | |
| 2006/0117371 A1 | 6/2006 | Margulis | |
| 2006/0146174 A1 | 7/2006 | Hagino | |
| 2006/0280157 A1 | 12/2006 | Karaoguz et al. | |
| 2007/0003224 A1 | 1/2007 | Krikorian et al. | |
| 2007/0005783 A1 | 1/2007 | Saint-Hillaire et al. | |
| 2007/0022328 A1 | 1/2007 | Tarra et al. | |
| 2007/0074115 A1 | 3/2007 | Patten et al. | |
| 2007/0076604 A1 | 4/2007 | Litwack | |
| 2007/0168543 A1 | 7/2007 | Krikorian et al. | |
| 2007/0180485 A1 | 8/2007 | Dua | |
| 2007/0198532 A1 | 8/2007 | Krikorian et al. | |
| 2007/0234213 A1 | 10/2007 | Krikorian et al. | |
| 2007/0286596 A1 | 12/2007 | Lonn | |
| 2008/0019276 A1 | 1/2008 | Takatsuji et al. | |
| 2008/0037573 A1* | 2/2008 | Cohen | 370/412 |
| 2008/0059533 A1 | 3/2008 | Krikorian | |
| 2008/0134267 A1 | 6/2008 | Moghe et al. | |
| 2008/0195744 A1 | 8/2008 | Bowra et al. | |
| 2008/0199150 A1 | 8/2008 | Candelore | |
| 2008/0294759 A1* | 11/2008 | Biswas et al. | 709/222 |
| 2008/0307456 A1 | 12/2008 | Beetcher et al. | |
| 2008/0307462 A1 | 12/2008 | Beetcher et al. | |
| 2008/0307463 A1 | 12/2008 | Beetcher et al. | |
| 2009/0074380 A1 | 3/2009 | Boston et al. | |
| 2009/0199248 A1 | 8/2009 | Ngo et al. | |
| 2010/0100915 A1 | 4/2010 | Krikorian et al. | |

FOREIGN PATENT DOCUMENTS

| | | |
|---|---|---|
| EP | 0838945 A | 4/1998 |
| EP | 1077407 A1 | 2/2001 |
| EP | 1443766 A2 | 8/2004 |
| EP | 1691550 A | 8/2006 |
| EP | 1830558 A1 | 9/2007 |
| KR | 19990082855 A | 11/1999 |
| KR | 20010211410 A | 8/2001 |
| WO | 0133839 A1 | 5/2001 |
| WO | 0147248 A2 | 6/2001 |
| WO | 0193161 A1 | 12/2001 |
| WO | 03026232 A1 | 3/2003 |
| WO | 03052552 A2 | 6/2003 |
| WO | 03098897 A | 11/2003 |
| WO | 2004032511 A1 | 4/2004 |
| WO | 2005050898 A2 | 6/2005 |
| WO | 2006064454 A1 | 6/2006 |
| WO | 2006074110 A | 7/2006 |
| WO | 2007027891 A2 | 3/2007 |
| WO | 2007051156 A2 | 5/2007 |
| WO | 2007141555 A2 | 12/2007 |
| WO | 2007149466 A2 | 12/2007 |
| WO | 2008024723 A | 2/2008 |

OTHER PUBLICATIONS

USPTO, Final Office Action mailed Nov. 12, 2009; U.S. Appl. No. 11/620,707, filed Jan. 7, 2007.

USPTO, Non-Final Office Action mailed Nov. 23, 2009; U.S. Appl. No. 11/683,862, filed Mar. 8, 2007.

USPTO, Non-Final Office Action mailed Oct. 1, 2009; U.S. Appl. No. 11/778,287, filed Jul. 16, 2007.

USPTO Final Office Action mailed Dec. 30, 2009; U.S. Appl. No. 11/147,664, filed Jun. 7, 2005.

European Patent Office, European Search Report, mailed Sep. 28, 2009 for European Application No. EP 06 78 6175.

International Search Report for PCT/US2008/069914 mailed Dec. 19, 2008.

PCT Partial International Search, PCT/US2009/054893, mailed Dec. 23, 2009.

Newton's Telecom Dictionary, 21st ed., Mar. 2005.

Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.

Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.

Lowekamp, B. et al. "A Hierarchy of Network Performance Characteristics for Grid Applications and Services," GGF Network Measurements Working Group, pp. 1-29, May 24, 2004.

Meyer, Derrick "MyReplayTV™ Creates First-Ever Online Portal to Personal Ti! Service; Gives Viewers Whole New Way to Interact With Programming," http://web.archive.org/web/20000815052751/http://www.myreplaytv.com/, Aug. 15, 2000.

Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.

Srisuresh, P. et al. "Traditional IP Network Address Translator (Traditional NAT)," Network Working Group, The Internet Society, Jan. 2001.

Lucas, Brian et al. "Systems and Methods for Establishing Connections Between Devices Communicating Over a Network," U.S. Appl. No. 12/426,103, filed Apr. 17, 2009.
Thiyagarajan, Venkatesan et al. "Always-On-Top Media Player Launched From a Web Browser," U.S. Appl. No. 12/617,271, filed Nov. 12, 2009.
Paul, John Michael et al. "Systems and Methods for Delivering Messages Over a Network," U.S. Appl. No. 12/619,192, filed Nov. 16, 2009.
Rao, Padmanabha R. et al. "Methods and Apparatus for Establishing Network Connections Using an Inter-Mediating Device," U.S. Appl. No. 12/642,368, filed Dec. 18, 2009.
Dham, Vikram et al. "Systems and Methods for Establishing Network Connections Using Local Mediation Services," U.S. Appl. No. 12/644,918, filed Dec. 22, 2009.
Paul, John et al. "Systems and Methods for Remotely Controlling Media Server Via a Network," U.S. Appl. No. 12/645,870, filed Dec. 23, 2009.
Bajpal, Parimal et al. "Method and Node for Transmitting Data Over a Communication Network using Negative Ackhowledgement," U.S. Appl. No. 12/404,920, filed Mar. 16, 2009.
Bajpal, Parimal et al. "Method and Note for Employing Network connections Over a Connectinoless Transport Layer Protocol," U.S. Appl. No. 12/405,062, filed Mar. 16, 2009.
Asnis, Ilya et al. "Mediated Network address Translation Traversal" U.S. Appl. No. 12/405,039, filed Mar. 16, 2009.
China State Intellectual Property Office "First Office Action," issued Jan. 8, 2010, for Application No. 200810126554.0.
USPTO Final Office action mailed Jan. 25, 2010; U.S. Appl. No. 11/734,277, filed Apr. 12, 2007.
Australian Government "Office Action," Australian Patent Application No. 2006240518, mailed Nov. 12, 2009.
Jain, Vikal Kumar "Systems and Methods for Coordinating Data Communication Between Two Device," U.S. Appl. No. 12/699,280, filed Feb. 3, 2010.
Gangotri, Arun L. et al. "Systems and Methods and Program Applications for Selectively Restructuring the Placeshiftnig of Copy Protected Digital Media Content," U.S. Appl. No. 12/623,955, filed Nov. 23, 2009.
Paul, John et al. "Systems and Methods for Searching Media Content," U.S. Appl. No. 12/648,024, filed Dec. 28, 2009.
Newton's Telcom Dictionary, 20th ed., Mar. 2004.
"The Authoritative Dictionary of IEEE Standard Terms," 7th ed. 2000.
Gurzhi, Alexander et al. "Systems and Methods for Emulation Network-Enabled Media Components," U.S. Appl. No. 12/711,830, filed Feb. 24, 2010.
Conway, Frank et al. "Systems and Methods for Creating Variable Length Clips from a Media Stream," U.S. Appl. No. 12/347,465, filed Dec. 31, 2008.
Bajpai, Parimal et al. "Systems and Methods of Controlling the Encoding of a Media Stream," U.S. Appl. No. 12/339,878, filed Dec. 19, 2008.
Malone, Edward D. et al. "Systems and Methods for Controlling Media Devices," U.S. Appl. No. 12/256,344, filed Oct. 22, 2008.
Banger, Shashidhar et al. "Systems and Methods for Determining Attributes of Media Items Accessed Via a Personal Media Broadcaster," U.S. Appl. No. 12/334,959, filed Dec. 15, 2008.
Kulkarni, Anant Madhava "Systems and Methods for Creating Logical Media Streams for Media Storage and Playback," U.S. Appl. No. 12/323,907, filed Nov. 26, 2008.
Rao, Padmanabha R. "Systems and Methods for Linking Media Content," U.S. Appl. No. 12/359,784, filed Jan. 26, 2009.
Krikorian, Blake Gary et al. "Systems and Methods for Presenting Media Content Obtained From Multiple Sources," U.S. Appl. No. 12/408,456, filed Mar. 20, 2009.
Krikorian, Blake Gary et al. "Systems and Methods for Projecting Images From a Computer System," U.S. Appl. No. 12/408.460, filed Mar. 20, 2009.
International Search Report and Written Opinion for International Application No. PCT/US2006/025911, mailed Jan. 3, 2007.
International Search Report for International Application No. PCT/US2007/063599, mailed Dec. 12, 2007.
International Search Report for International Application No. PCT/US2007/076337, mailed Oct. 20, 2008.
International Search Report and Written Opinion for International Application No. PCT/US2006/025912, mailed Jul. 17, 2008.
International Search Report for International Application No. PCT/US2008/059613, mailed Jul. 21, 2008.
International Search Report and Written Opinion for International Application No. PCT/US2008/080910, mailed Feb. 16, 2009.
Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.
Capable Networks LLC "Keyspan Remote Control—Controlling Your Computer With a Remote" [Online], Feb. 21, 2006, XP002512495; retrieved from the Internet: <URL:http://www.slingcommunity.com/article/11791/Keyspan-Remote-Control---Controlling-Your-Computer-With-a-Remote/?highlight=remote+control>; retrieved on Jan. 28, 2009.
Wikipedia "LocationFree Player" [Online], Sep. 22, 2007, XP002512400; retrieved from the Internet: <URL:http://en.wikipedia.org/w/index.php?title=LocationFree_Player&oldid=159683564>; retrieved on Jan. 28, 2009.
Sling Media Inc. "Slingbox User Guide" [Online] 2006, XP002512553; retrieved from the Internet: <URL:http://www.slingmedia.hk/attach/en-US_Slingbox_User_Guide_v1.2.pdf>; retrieved on Jan. 29, 2009.
Sony Corporation "LocationFree TV" [Online], 2004, SP002512410; retrieved from the Internet: <URL:http://www.docs.sony.com/release/LFX1_X5revision.pdf>; retrieved on Jan. 28, 2009 [note—document uploaded in two parts as file exceeds the 25MB size limit].
Sony Corporation "LocationFree Player Pak—LocationFree Base Station—LocationFree Player" [Online] 2005, XP002512401; retrieved from the Internet: <URL:http://www.docs.sony.com/release/LFPK1.pdf>; retrieved on Jan. 28, 2009.
European Patent Office, European Search Report for European Application No. EP 08 16 7880, mailed Mar. 4, 2009.
Mythtv Wiki, "MythTV User Manual" [Online], Aug. 27, 2007, XP002515046; retrieved from the Internet: <URL: http://www.mythtv.org/wiki?title=User_Manual:Introduction&oldid=25549>.
International Searching Authority, Written Opinion and International Search Report for International Application No. PCT/US2008/077733, mailed Mar. 18, 2009.
International Searching Authority, Written Opinion and International Search Report for International Application No. PCT/US2008/087005, mailed Mar. 20, 2009.
Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.
Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.
Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.
Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [05.2], figures 1,2.
USPTO, Non-Final Office Action mailed Dec. 17, 2004; U.S. Appl. No. 09/809,868, filed Mar. 15, 2001.
USPTO, Final Office Action mailed Jul. 28, 2005; U.S. Appl. No. 09/809,868, filed Mar. 15, 2001.
USPTO, Non-Final Office Action mailed Jan. 30, 2006; U.S. Appl. No. 09/809,868, filed Mar. 15, 2001.
USPTO, Final Office Action mailed Aug. 10, 2006; U.S. Appl. No. 09/809,868, filed Mar. 15, 2001.

USPTO, Non-Final Office Action mailed Jun. 19, 2007; U.S. Appl. No. 09/809,868, filed Mar. 15, 2001.
USPTO, Non-Final Office Action mailed Apr. 16, 2008; U.S. Appl. No. 09/809,868, filed Mar. 15, 2001.
USPTO, Final Office Action mailed Sep. 18, 2008; U.S. Appl. No. 09/809,868, filed Mar. 15, 2001.
USPTO, Non-Final Office Action mailed Mar. 31, 2009; U.S. Appl. No. 09/809,868, filed Mar. 15, 2001.
USPTO, Non-Final Office Action mailed May 1, 2008; U.S. Appl. No. 11/111,265, filed Apr. 21, 2005.
USPTO, Final Office Action mailed Dec. 29, 2008; U.S. Appl. No. 11/111,265, filed Apr. 21, 2005.
USPTO, Non-Final Office Action mailed Jun. 8, 2009; U.S. Appl. No. 11/111,265, filed Apr. 21, 2005.
USPTO, Non-Final Office Action mailed Jun. 26, 2008; U.S. Appl. No. 11/620,707, filed Jan. 7, 2007.
USPTO, Final Office Action mailed Oct. 21, 2008; U.S. Appl. No. 11/620,707, filed Jan. 7, 2007.
USPTO, Non-Final Office Action mailed Mar. 25, 2009; U.S. Appl. No. 11/620,707, filed Jan. 7, 2007.
USPTO, Non-Final Office Action mailed Aug. 7, 2008; U.S. Appl. No. 11/620,711, filed Jan. 7, 2007.
USPTO, Final Office Action mailed Feb. 9, 2009; U.S. Appl. No. 11/620,711, filed Jan. 7, 2007.
USPTO, Non-Final Office Action mailed Feb. 25, 2009; U.S. Appl. No. 11/683,862, filed Mar. 8, 2007.
USPTO, Non-Final Office Action mailed Dec. 24, 2008; U.S. Appl. No. 11/147,985, filed Jun. 7, 2005.
USPTO, Non-Final Office Action mailed Jun. 25, 2008; U.S. Appl. No. 11/428,254, filed Jun. 30, 2006.
USPTO, Final Office Action mailed Feb. 6, 2009; U.S. Appl. No. 11/428,254, filed Jun. 30, 2006.
USPTO, Non-Final Office Action mailed May 15, 2009; U.S. Appl. No. 11/147,664, filed Jun. 7, 2005.
Sonic Blue "ReplayTV 5000 User's Guide," 2002, entire document.
Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.
Microsoft Corporation; Harman/Kardon "Master Your Universe" 1999.
Matsushita Electric Corporation of America MicroCast: Wireless PC Multimedia Transceiver System, Nov. 1998.
"Wireless Local Area Networks: Issues in Technology and Standards" Jan. 6, 1999.
USPTO, Final Office Action mailed Jun. 25, 2009; U.S. Appl. No. 11/147,985, filed Jun. 7, 2005.
Krikorian, Jason, U.S. Appl. No. 11/734,277, filed Apr. 12, 2007.
Williams, George Edward, U.S. Appl. No. 12/167,041, filed Jul. 2, 2008.
Rao, Padmanabha R., U.S. Appl. No. 12/166,039, filed Jul. 1, 2008.
International Search Report and Written Opinion, PCT/US2005/020105, Feb. 15, 2007, 6 pages.
International Search Report and Written Opinion for PCT/US2006/04382, mailed Apr. 27, 2007.
Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www.tvbrick.com/en/affiliate/tvbs/tvbrick/document18/print>.
Faucon, B. "TV 'Brick' Opens up Copyright Can of Worms," Financial Review, Jul. 1, 2003, [online [Retrieved on Apr. 12, 2006] Retrieved from the Internet, URL:http://afr.com/cgi-bin/newtextversions.pl?storyid+1056825330084&3ate+2003/07/01&pagetype+printer§ion+1053801318705&path+articles/2003/06/30/0156825330084.html.].
Balster, Eric J., "Video Compression and Rate Control Methods Based on the Wavelet Transform," The Ohio State University 2004, pp. 1-24.
Kulapala et al., "Comparison of Traffic and Quality Characteristics of Rate-Controlled Wavelet and DCT Video," Arizona State University, Oct. 11, 2004.
Skodras et al., "JPEG2000: The Upcoming Still Image Compression Standard," May 11, 2000, 14 pages.
Taubman et al., "Embedded Block Coding in JPEG2000," Feb. 23, 2001, pp. 1-8 of 36.
Kessler, Gary C., An Overview of TCP/IP Protocols and the Internet; Jan. 16, 2007, retrieved from the Internet on Jun. 12, 2008 at http://www.garykessler.net/libraiy/tcpip.html; originally submitted to the InterNIC and posted on their Gopher site on Aug. 5, 1994.
Roe, Kevin, "Third-Party Observation Under EPC Article 115 on the Patentability of an Invention," Dec. 21, 2007.
Roe, Kevin, Third-Party Submission for Published Application Under CFR §1.99, Mar. 26, 2008.
China State Intellectual Property Office "First Office Action," issued Jul. 31, 2009, for Application No. 200580026825.X.
USPTO, Non-Final Office Action, mailed Aug. 4, 2009; U.S. Appl. No. 11/734,277, filed Apr. 12, 2007.
USPTO, Final Office Action, mailed Jul. 31, 2009; U.S. Appl. No. 11/683,862, filed Mar. 8, 2007.
USPTO, Non-Final Office Action, mailed Aug. 5, 2009; U.S. Appl. No. 11/147,663, filed Jun. 7, 2005.
USPTO, Non-Final Office Action, mailed Sep. 3, 2009; U.S. Appl. No. 11/620,711, filed Jan. 7, 2007.
Einaudi, Andrew E. et al. "Systems and Methods for Selecting Media Content Obtained from Multiple Sources," U.S. Appl. No. 12/543,278, filed on Aug. 18, 2009.
Malode, Deepak Ravi "Remote Control and Method for Automatically Adjusting the Volume Output of an Audio Device," U.S. Appl. No. 12/550,145, filed Aug. 28, 2009.
Akella, Aparna Sarma "Systems and Methods for Event Programming Via a Remote Media Player," U.S. Appl. No. 12/537,057, filed Aug. 6, 2009.
Shah, Bhupendra Natwerlan et al. "Systems and Methods for Transcoding and Place Shifting Media Content," U.S. Appl. No. 12/548,130, filed Aug. 26, 2009.
Banger, Shashidhar et al. "Systems and Methods for Automatically Controlling the Resolution of Streaming Video Content," U.S. Appl. No. 12/537,785, filed Aug. 7, 2009.
Panigrahi, Biswaranjan "Home Media Aggregator System and Method," U.S. Appl. No. 12/538,681, filed Aug. 10, 2009.
Nandury, Venkata Kishore "Adaptive Gain Control for Digital Audio Samples in a Media Stream," U.S. Appl. No. 12/507,971, filed Jul. 23, 2009.
Shirali, Amey "Systems and Methods for Providing Programming Content," U.S. Appl. No. 12/538,676, filed Aug. 10, 2009.
Thiyagarajan, Venkatesan "Systems and Methods for Virtual Remote Control of Streamed Media," U.S. Appl. No. 12/538,664, filed Aug. 10, 2009.
Thiyagarajan, Venkatesan et al. "Localization Systems and Method," U.S. Appl. No. 12/538,783, filed Aug. 10, 2009.
Shirali, Amey et al. "Methods and Apparatus for Seeking Within a Media Stream Using Scene Detection," U.S. Appl. No. 12/538,784, filed Aug. 10, 2009.
Thiyagarajan, Venkatesan "Systems and Methods for Updating Firmware Over a Network," U.S. Appl. No. 12/538,661, filed Aug. 10, 2009.
Iyer, Satish "Methods and Apparatus for Fast Seeking Within a Media Stream Buffer," U.S. Appl. No. 12/538,659, filed Aug. 10, 2009.
European Patent Office, International Searching Authority, "International Search Report," for International Application No. PCT/US2009/049006, mailed Sep. 11, 2009.
European Patent Office, International Searching Authority, "International Search Report," mailed Mar. 30, 2010; International Application PCT/US2009/068468 filed Dec. 27, 2009.
USPTO Final Office Action mailed Mar. 12, 2010; U.S. Appl. No. 11/620,711, filed Jan. 7, 2007.
USPTO Non-Final Office Action mailed Mar. 19, 2010; U.S. Appl. No. 11/147,664, filed Jun. 7, 2005.
USPTO Non-Final Office Action mailed Mar. 31, 2010; U.S. Appl. No. 11/620,707, filed Jan. 7, 2007.
USPTO Final Office Action mailed Mar. 3, 2010; U.S. Appl. No. 11/111,265, filed Apr. 21, 2005.
Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBB: 1-920682-00-7, sections 2 and 2.1.1.

China State Intellectual Property Office "Office Action" issued Mar. 18, 2010 for Application No. 200680022520.6.

Canadian Intellectual Property Office "Office Action" mailed Feb. 18, 2010 for Application No. 2569610.

European Patent Office "European Search Report," mailed May 7, 2010 for Application No. 06786174.0.

China State Intellectual Property Office "Office Action" issued Apr. 13, 2010 for Application No. 200580026825.X.

Margulis, Neal "Apparatus and Method for Effectively Implementing a Wireless Television System," U.S. Appl. No. 12/758,193, filed Apr. 12, 2010.

Margulis, Neal "Apparatus and Method for Effectively Implementing a Wireless Television System," U.S. Appl. No. 12/758,194, filed Apr. 12, 2010.

Margulis, Neal "Apparatus and Method for Effectively Implementing a Wireless Television System," U.S. Appl. No. 12/758,196, filed Apr. 12, 2010.

Kirkorian, Jason Gary et al. "Personal Media Broadcasting System with Output Buffer," U.S. Appl. No. 12/757,697, filed Apr. 9, 2010.

Tarra, Raghuveer et al. "Firmware Update for Consumer Electronic Device," U.S. Appl. No. 12/757,714, filed Apr. 9, 2010.

Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1,Nov. 27, 2000, pp. 293-297, XP001195580; ISBN: 978-0-7803-6452-3, lines 15-20 of sec. II on p. 293, fig. 1.

European Patent Office, International Searching Authority, "International Search Report and Written Opinion," mailed Jun. 4, 2010 for International Application No. PCT/IN2009/000728, filed Dec. 18, 2009.

USPTO Non-Final Office Action mailed Jun. 23, 2010; U.S. Appl. No. 11/933,969, filed Nov. 1, 2007.

* cited by examiner

MEDIA STREAMING DEVICE WITH GATEWAY FUNCTIONALITY

PRIORITY CLAIM

This application claims priority to U.S. Provisional Patent Application Ser. No. 60/975,239, entitled "Media Streaming Device with Gateway Functionality" and filed on Sep. 26, 2007, which is incorporated herein by reference.

TECHNICAL FIELD

This application generally relates to devices and techniques for streaming audio/visual content over a network, such as media place shifting devices.

BACKGROUND

Media streaming devices enable users to view audio-visual (A/V) content from their cable, satellite, television or recording devices over a home network or the Internet. The media streaming devices typically connect to a network and stream the A/V content through the network to a client device (e.g., televisions and personal computers). Users may view the A/V content at various locations using the same or different client devices. The media streaming device may be located within the same local area network (LAN) as the client devices or the media streaming device may be located outside the LAN where the client devices resides.

Regardless of whether the media streaming devices are located in the same LAN as the client devices or outside the LAN, the user typically configures the media streaming devices to communicate with the client devices via networks. The configuration procedure includes setting various parameters and options associated with a modem or other network access device. The configuration procedure may involve detailed knowledge about the network structure and may therefore cause frustration on the part of the users, especially if the users have limited or no network configuration skills. Further, the media streaming devices may also have multiple connectors for various discrete communication channels. In such cases, the user typically also enables or disables these connectors depending on the configuration of the network surrounding the media streaming devices.

Accordingly, the process of installing and configuring the media streaming devices to work in a network environment may be a demanding and time consuming task for the users that can impede wider deployment of the media streaming devices.

BRIEF SUMMARY

Various methods and devices provide place shifting of a media stream to a remote device while also providing gateway functionality between a local area network (LAN) and/or a wide area network (WAN). The gateway includes a media interface for receiving audio/visual (A/V) signals from the media source, as well as interfaces to the LAN and/or the WAN. A media streaming module receives the A/V signals from the media interface and processes the received A/V signals to thereby create the media stream. The media stream is then transmitted to the remote device via the network interface.

In other embodiments, a method is provided for transmitting a network stream representing audio/visual signals received from a media source to a remote device using a device that comprises a first module and a second module that provides communications between a local area network and/or a wide area network. The method comprises receiving the audio/visual signals from the media source, and processing the audio/visual signals to create the media stream at the media streaming module. The network stream is provided from the first module to the second module, and transmitted to the remote device via at least one of the local area network and/or the wide area network.

In still other embodiments, a gateway device interfacing with a local area network and a wide area network additionally provides a media stream to a remote device in response to audio/visual signals received from a media source. The gateway device comprises a media interface configured for receiving the audio/visual signals from the media source, as well as a first network interface to the local area network and a second network interface to the wide area network. A modem module is configured to provide communication between the first and second network interface, wherein the modem module is further configured to obtain a network address that was previously allocated to another device operating on the local area network and to use the previously-allocated network address during subsequent communications on the wide area network. A media streaming module is configured to receive the audio/visual signals from the media interface, to process audio/visual signals to create the media stream, and to transmit the media stream to the modem module for transmission to the remote device via at least one of the local area or the wide area network.

Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Overall Network Architecture

Various embodiments provide a gateway device with media streaming device functionality. The gateway device controls access from a local area network (LAN) to a wide area network (WAN) and vice-versa. In various embodiments, the gateway device disguises itself as a router or other network device within the LAN by using the media access control (MAC) address of the router or other network devices (e.g., local client devices or streaming devices) in the LAN. The gateway device can also use the same Internet Protocol (IP) address allocated to the router or other network devices in the LAN. Some embodiments of the gateway device also discover other media streaming devices installed in the LAN by capturing discovery requests from local client devices to the WAN and extracting information of the local client devices from the discovery packets. Various gateway devices may also selectively enable or disable their connectors after detecting the presence of signals in the connectors. Such gateway devices may therefore function as media streaming devices (without gateway functionality) if signals are not detected in the WAN connection. In another mode of operation, the device may disable media streaming and simply act as a gateway device.

Figure 1:
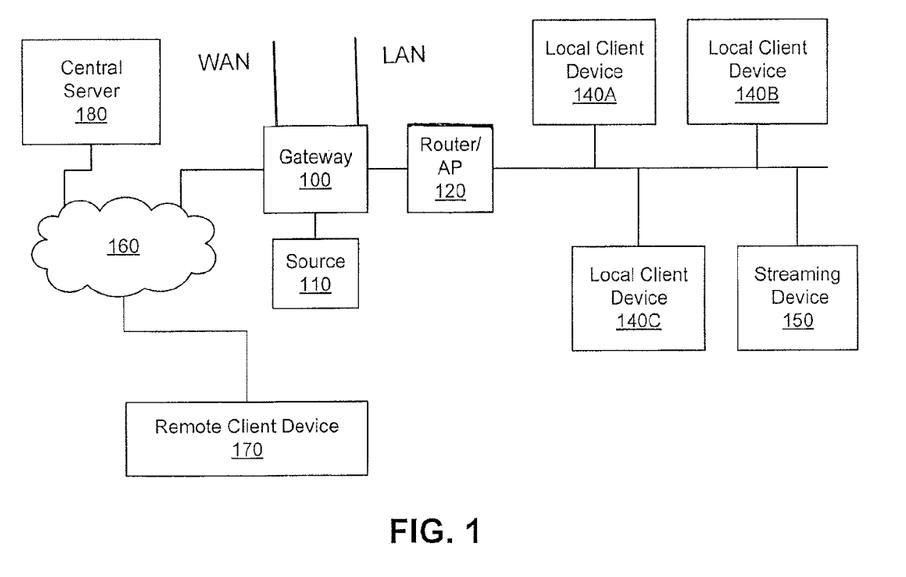
FIG. 1 is an overall schematic diagram of an exemplary system including a gateway device.

FIG. 1 illustrates an overall schematic diagram of a system including a gateway device 100, according to one embodiment. The gateway device 100 is an access point to the WAN for the local client devices 140A-C and any other streaming devices 150 in the LAN. The WAN may, for example, be implemented by Public Switched Telephone Network (PSTN), cable or satellite television infrastructure, General Packet Radio Service (GPRS), third-generation (3G) mobile, High Speed Download Packet Access (HSDPA), Worldwide Interoperability for Microwave Access (WiMAX), and/or the like. The WAN may include, among other network components, a central server 180 and a remote client device 170. The remote client device 170 may receive media streams created by the gateway device 100 via the WAN and play the A/V content decoded from the media streams. In such embodiments, LAN entities 140A-C and 150 may or may not be present.

In one embodiment, a central server 180 is coupled to the remote network 160 and provides one or more roles, including that of a domain name server (DNS). In order to provide a consistent method of accessing the LAN, the central server 180 may assign a DNS name to the gateway device and may correlate that DNS name to the dynamic IP address allocated to the user as described, for example, in U.S. patent application Ser. No. 11/147,664 entitled "Personal Media Broadcasting System," filed on Jun. 7, 2005 (now published as US Patent Publication No. 2006/0095471), which is incorporated by reference herein in its entirety.

The LAN may, for example, be implemented by Ethernet, Wireless Fidelity (Wi-Fi), powerline Ethernet, any combination of these technologies, and/or any other local area network as appropriate. The local area network may include one or more local client devices 140A-C. The local devices 140A-C include devices such as personal computers or televisions that may communicate with the gateway 100 or the streaming device 150 to decode and play the media stream sent by the gateway 100 or the local streaming device 150. The LAN may be coordinated and managed by one or more routers (and/or access point(s)) 120. In one embodiment, the router (or access module) 120 is integrated with the gateway device 100.

The gateway device 100 may also be coupled to a media source 110 for receiving the A/V signals. The media source 110 may include any of various devices including, among other devices, cable set-top boxes, satellite set-top boxes, DVD players, digital video recorders (DVRs), videocassette recorders (VCRs), and television receivers. The gateway device 100 processes the A/V signals for transmission, as described below with reference to FIG. 2.

Gateway Device Architecture

Figure 2:
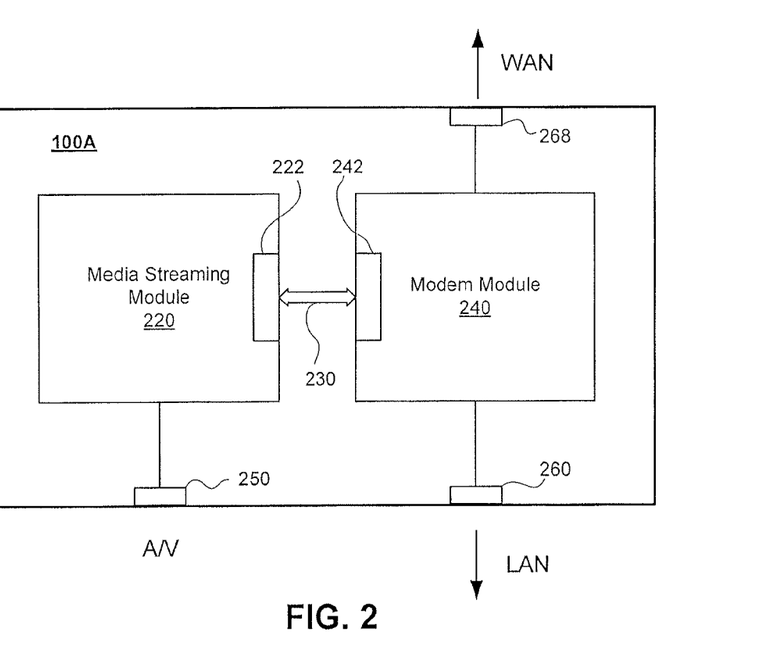
FIG. 2 is a block diagram of an exemplary gateway device according to one embodiment.

FIG. 2 illustrates a block diagram of the gateway device 100A, according to one embodiment. The gateway device 100A includes a media streaming module 220, and a modem module 240. The media streaming module 220 receives the A/V signals from the source 110 via an A/V input 250, and processes the A/V signals for transmission to the local client device 140A-C or the remote client device 170 as described, for example, in U.S. patent application Ser. No. 11/147,664 entitled "Personal Media Broadcasting System," filed on Jun. 7, 2005 (now published as US Patent Publication No. 2006/0095471). The modem module 240 communicates with the WAN via a WAN connector 268. The modem module 240 communicates with the LAN via a LAN connector 260.

The A/V input 250 may be either analog or digital inputs including, for example, component video, High-Definition Multimedia Interface (HDMI), an S-video, Digital Visual Interface (DVI), IEEE 1394, Universal Serial Bus (USB), Serial Digital Interface (SDI), Toslink optical, or composite coax digital audio. The gateway device 100A may be provided with one or more A/V input connectors of the same type or different types.

The modem module 240 functions to provide communication between the LAN and the WAN. The modem module 240 modulates signals received from the LAN to signals for transmission over the WAN and/or demodulates signals from the WAN to signals for transmission to the LAN. In one embodiment, the modem module 240 is a cable modem providing communication over the cable television infrastructure. The LAN connector 260 and the router (or access point) 120 may be connected via cables such as an Ethernet cable.

The media streaming module 220 and the modem module 240 communicate via a dedicated communication channel 230. In one embodiment, the communication channel 230 is implemented using a host-port interface (HPI) and a counterpart external memory interface (EMIF). The HPI and the EMIF form a HPI-EMIF bridge. In one embodiment, the interface 222 of the media streaming module 220 is implemented as the HPI, and the interface 242 of the modem module 240 is implemented as EMIF. The interface module 222 encapsulates the TCP/IP packets or Ethernet packets into HpiEmifPackets or decapsulates the HpiEmifPackets into the TCP/IP packets or Ethernet packets. Likewise, the modem module 240 includes an interface module 242 for receiving and decapsulating the HpiEmifPackets to the TCP/IP packets or Ethernet packets, and encapsulating the TCP/IP packets or Ethernet packets to the HpiEmifPackets. In another embodiment, a communication channel between the modem module 240 and the LAN is shared for communicating between the media streaming module 220 and the modem module 240, as explained in detail below with reference to FIG. 3.

In one embodiment, the media streaming module 220 generates TCP/IP packets or Ethernet packets based on the A/V signals received via the A/V input 250, as described, for example, in U.S. patent application Ser. No. 11/147,664 entitled "Personal Media Broadcasting System," filed on Jun. 7, 2005 (now published as US Patent Publication No. 2006/0095471). Then the interface 222 encapsulates the TCP/IP packets or Ethernet packets into the HpiEmifPackets for transmission over the HPI-EMIF bridge 230. Likewise, any data to be transmitted from the modem module 240 to the media streaming module 220 is encapsulated into HpiEmifPackets for transmission over the HPI-EMIF bridge 230. Then, the HpiEmifPackets from the modem module 240 is decapsulated at the media streaming module 220.

To enable the media streaming module 220 to communicate via the modem module 240, synchronization information is exchanged when the gateway device 100A is activated or restarted. Also, the media streaming module 220 configures the modem module 240 to send certain packets received via the WAN or the LAN to the media streaming module 220 via the HPI-EMIF bridge 230. The media streaming module 220 also configures the media streaming module 220 to inform certain changes in the modem module 240 to the media streaming module, and sends instructions to configure the modem module 240 so that the modem module 240 functions as a conduit for the media streaming module 220.

The modem module 240 may transmit the A/V signals from the media streaming module 220 to the WAN or the LAN. Specifically, after the modem module 240 receives the A/V signals from the media streaming module 220 via the interface 222 and the HPI-EMIF bridge 230, the interface 242 converts the HpiEmifPackets from the media streaming module 220 back to the TCP/IP packets. The modem module 230 then inserts the TCP/IP packets in packet streams sent to the WAN or the LAN or both.

In one embodiment, the HPI-EMIF bridge 230 also transmits packets from the modem module 240 to the media streaming module 220. The modem module 240 filters the TCP/IP packets or Ethernet packets from the LAN or the WAN that needs to be transmitted to the media streaming module 220. The filtered TCP/IP packets are then converted to the HpiEmifPackets by the interface module 242 for transmission to the media streaming module 220 over the HPI-EMIF bridge 230. The interface 222 of the media streaming module 220 then converts the HpiEmifPackets into the TCP/IP packets for further processing. The TCP/IP packets may then be processed as describe, for example, in U.S. patent application Ser. No. 11/147,664 entitled "Personal Media Broadcasting System," filed on Jun. 7, 2005 (now published as US Patent Publication No. 2006/0095471).

By providing the HPI-EMIF bridge 230 dedicated for communication between the media streaming module 220 and the modem module 240, the modem module 240 may perform its gateway functions without added communication traffic between the media streaming module 220 and the modem module 240. Also, using the interface modules 222, 242 in conjunction with the HPI-EMIF bridge 230 enables essentially the same media streaming module 220 of a personal streaming module operable in the LAN environment to be used in the gateway device 100A.

In one or more embodiments, shared memory in the form of an EMIF-EMIF bridge may also be used to connect the streaming module 220 and the modem module 240.

Figure 3:
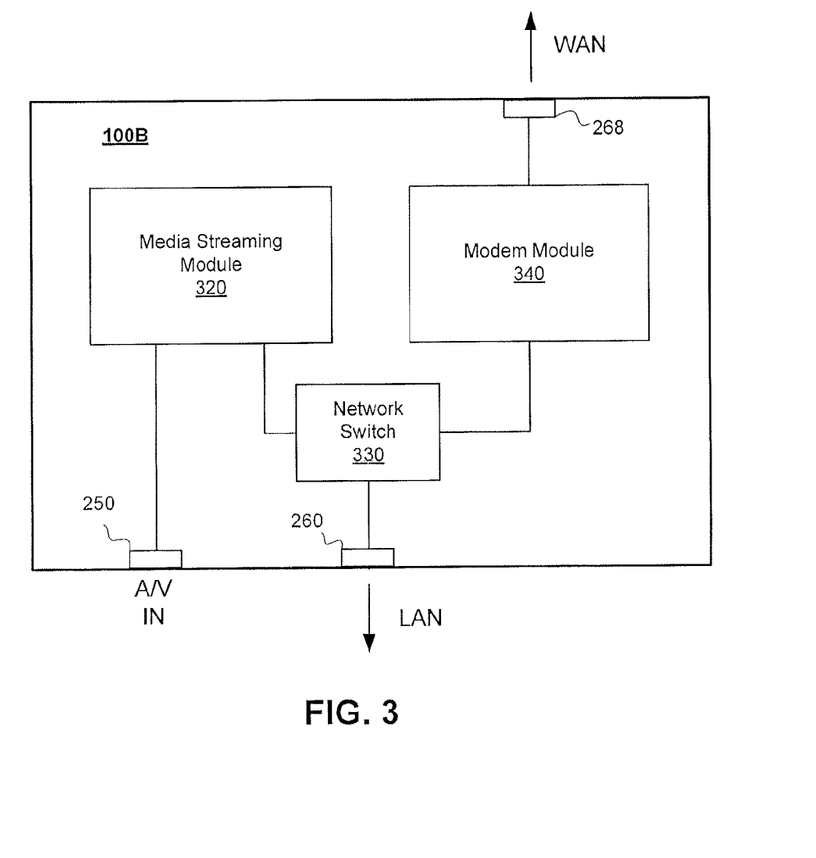
FIG. 3 is a block diagram of an exemplary gateway device according to another embodiment.

FIG. 3 is a block diagram illustrating a gateway device 100B according to another embodiment. The embodiment of FIG. 3 is substantially the same as the embodiment of FIG. 2 except that there is no dedicated communication channel between the media streaming module 320 and the modem module 340. Instead, a network switch 330 is provided to switch a shared communication channel. Specifically, the network switch 330 switches the communication path between the media streaming module 320, the modem module 340, and the router (or access point) 120. The network switch 330 has two modes: the internal communication mode and the external communication mode. In the internal communication mode, the network switch 330 opens a communication channel between the media streaming module 320 and the modem module 340. In the external communication mode, the network switch 330 opens a communication channel between the router (or access point) 120 and the modem module 340.

In one embodiment, the modem module 340 receives and stores TCP/IP packets or Ethernet packets from the media streaming module 320 in the internal communication mode. In a subsequent external communication mode, the modem module 340 inserts the TCP/IP packets or Ethernet packets from the media streaming module 320 into the packet streams sent to the LAN or the WAN.

In one embodiment, the modem module 340 receives TCP/IP packets or Ethernet packets for transmission to the media streaming module 320 from the router (or access module) 120 and stores the packets. In a subsequent internal communication mode, the modem module 340 sends the stored packets to the media streaming module 320 via the network switch 330.

The timing for each mode may be controlled based on the amount of network traffic exchanged between the two networks (the WAN and the LAN), and the two modules 320, 340.

IP/Mac Address Spoofing

In one embodiment, the modem module 220, 320 of the gateway device 100 uses a media access control (MAC) address and Internet Protocol (IP) address of the router (or access point) 120, the local client devices 140A-C, or the streaming device 150 in the LAN as opposed to using its own MAC address or IP address. After the gateway device 100 is installed, the gateway device 100 communicates with the central server 180 or monitors the packets to and from the LAN to determine IP addresses or MAC addresses of the router (or access point) 120, the local client devices 140A-C or the streaming device 150. The gateway device 100 then uses the IP addresses or MAC address of the router (or access point) 120, the local client devices 140A-C or the streaming device 150 to communicate over the WAN.

In one embodiment, the gateway device 100 detects the Dynamic Host Configuration Protocol (DHCP) message passing through. If the DHCP message is detected, the gateway device 100 uses the IP address and the MAC address included in the DHCP message. If the DHCP message is unavailable, the IP address and the MAC address of the router (or access point) 120, local devices 140A-C or the streaming device 150 may be extracted from packets transmitted via the gateway device 100. After determining the MAC address of a router (or access point) 120, local client devices 140A-C or the streaming device 150 that was accessing the WAN (hereinafter collectively referred to as the "established LAN devices"), the media streaming module 220, 320 of the gateway device 100 uses the IP address previously allocated to the established LAN devices and the MAC address of the established LAN devices to communicate over the WAN.

The gateway device 100 remembers the MAC address of the router (or access point) 120, the local client devices 140A-C or the streaming device 150 by monitoring the packets from the established LAN devices. The extracted MAC addresses are used by the gateway device 100 in the DHCP message to first get an IP address from the ISP or MSO, and then later to communicate over the WAN. The central server of the ISP or the MSO may map the same MAC address to the same IP address, a new IP address need not be created to accommodate the gateway device 100. That is, the gateway device 100 may use the IP address previously allocated to the established LAN devices.

By using the MAC address and IP address of the established LAN devices, the configuration and installation procedure of the gateway device 100 may be simplified because the installation procedures associated with a new MAC address may be obviated. Using the MAC address and IP address of the established LAN device is also advantageous because the ISP or the MSO managing user's access to the WAN need not allocate a separate IP address to the MAC address of the gateway device 100. The reuse of the IP addresses allows the ISP or the MSO to reduce the number of IP address range needed to support its services.

The gateway device 100 stores the IP address and the MAC address of the established LAN device. Therefore, even after the established LAN device is deactivated or disconnected from the LAN, the gateway device 100 may continue to use the MAC address of the established LAN device without interruption. In one embodiment, the gateway device 100 may store a list of the IP addresses and the MAC addresses of the established LAN devices, and change the IP address or the MAC address being used when one IP address or MAC address causes conflicts with other network devices or other problems. The list of IP addresses and the MAC addresses may be modified by monitoring the DHCP message or packets transmitted via the gateway device 100.

In one embodiment, the gateway device 100 uses the IP address and the MAC address of the established LAN device that are detected most recently. By using the device that is detected most recently, the reliability of the communication to and from the gateway device 100 is increased because the gateway device 100 is less likely to use stale IP addresses or MAC addresses. If the gateway device 100 detects a new IP address or a MAC address while the streaming is in progress, the previous IP address and the MAC address are used until the streaming stops.

In one embodiment, the gateway device 100 also performs network address translation (NAT) to ensure that packets are properly routed to the established LAN device and the media streaming module 220, 320. The gateway device 100 and the established LAN device share the same IP address and the MAC address. Therefore, to route the packets properly, the gateway device 100 keeps track of the packets sent to the WAN via the gateway device 100 by storing information on the communication to the WAN. When packets arrive at the gateway device 100 from the WAN, the gateway device 100 determines whether the packets should be routed to the LAN or the media streaming module 220, 330 based on the stored information. If the gateway device 100 determines that the packets should be routed to the network devices in the LAN, the gateway device 100 sends the packets to the router (or access point) 120.

If the gateway device 100 determines that the destination of the packets are media streaming module 220, 320, the packets are sent from the modem module 240, 340 to the media streaming module 220, 320 via the dedicated channel 230 or the network switch 330, as explained above with reference to FIGS. 2 and 3.

The media streaming module 220, 320 may send packets to the modem module 240, 340 for transmission of the packets to the remote client device 170, the central server 180, or the local client devices 140A-C in the network. The media streaming module 320 may send packets directly to local client devices 140A-C via network switch 330. When sending the packets from the media streaming module 220, 320, the modem module 240, 340 may insert the IP address and the MAC address of the established LAN device as the source address of the packets. The modem module 240, 340 also keeps track of the packets sent by the media streaming module 220, 320 to determine if a packet received from the WAN or the LAN is to be sent to the media streaming module 220, 320.

Discovery of Media Streaming Devices

Conventionally, the media streaming devices is discovered by broadcasting of discovery requests from the local client devices on the LAN, and the media streaming devices responding to the discovery requests. For example, in FIG. 1, the local client devices 140A-C broadcast discovery requests on the LAN. The streaming device 150 on the LAN receives the discovery requests and responds to the request by unicasting a response to local client devices 140A-C that broadcasted the discovery requests. After the local client devices 140A-C receives the response from the streaming device 150, the communication is established between the local client devices 140A-C and the streaming device 150.

The gateway device 100, however, is located outside the LAN. Therefore, the gateway device 100 may not be detected or discovered by the local client devices 140A-C using such conventional methods. Therefore, a different mechanism may be used to establish connection between the gateway device 100 and the local client devices 140A-C on the LAN.

In one embodiment, the local client devices 140A-C send unicast discovery requests to the WAN to establish connection with the streaming devices outside the LAN. The discovery requests may be sent to a global IP address of a network device in the WAN. Alternatively, the discovery requests may be sent to a fake global IP address in the WAN. The gateway device 100 monitors a port used for sending such requests from the local client devices 140A-C and captures the discovery requests from the LAN. The local IP addresses of the local devices 140A-C sending out the discovery requests is extracted from the discovery requests. The gateway device 100 may then establish communication with the local client devices 140A-C using the local IP addresses obtained from the discovery requests.

Automatic Detection of Surrounding Network Environment

In one embodiment, the gateway device 100 automatically detects connections to the gateway device 100 and changes its modes of operation. The gateway device 100 may have more than one mode of operation: a gateway mode providing a gateway function and the media streaming function, a media streamer mode providing only the media streaming function, and a standby mode in which the gateway device 100 performs no operation.

If signal is detected in the LAN connector 260 but not in the WAN connector 268, the media streamer mode is enabled. In the media streamer mode, the gateway device 100 is placed in the LAN environment. The gateway device 100 functions like other network components in the LAN, and uses its own MAC address to identify itself and communicate via the LAN.

On the contrary, if the gateway device 100 detects signals in both the WAN connector 268 and the LAN connector 260, the gateway mode is enabled. In the gateway mode, the gateway device 100 uses the MAC address of the established LAN devices to communicate with the WAN, as explained above in detail.

If no signal is detected in both the WAN connector 268 and the LAN connector 260, the standby mode is enabled. In the standby mode, the gateway device 100 monitors the LAN connector 260 and the WAN connector 268 for signals so that the gateway device 100 may switch to the media streamer mode or the gateway mode after communication between the gateway device 100 and the LAN or the WAN is enabled.

In one embodiment, the gateway device 100 checks the connection status of the LAN connector 260 and the WAN connector 268 periodically or whenever the gateway device 100 is restarted. If a change in the connection status is detected, the gateway device 100 changes its mode accordingly.

The gateway devices described herein need not implement all of the features described above. That is, the gateway device may selectively implement the features of (1) providing media streaming functionality to the gateway device, (2) IP/MAC address spoofing, (3) discovering the media streaming devices, and (4) automatic detection of surrounding network environment. These features are distinct from each other; and therefore, implementation of one feature does not necessarily require implementation of the other features. Moreover, the features to be enabled in the gateway device may be different depending on the modes of the gateway device.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

What is claimed is:

1. A first device for providing a media stream to a second device, the first device comprising:
    an input interface configured to receive audio/visual signals from a media source;
    a local area network interface to a local area network;
    a wide area network interface to a wide area network;
    a media streaming module disposed within the first device and coupled to the input interface, wherein the media streaming module is configured to create the media stream from the audio/visual signals received from the input interface, wherein the media streaming module comprises a host port interface, and wherein the media streaming module is configured to format the created media stream into network packets that are routable on at least one of the local area network and the wide area network and to encapsulate the network packets into an interface format that is compatible with the host port interface; and
    a modem module disposed within the first device, wherein the modem module is coupled to the wide area network interface to provide a gateway between the local area network and the wide area network, wherein the modem module comprises an external memory interface coupled to the media streaming module via an HPI-EMIF bridge that provides a dedicated communications channel between the media streaming module and the modem module, and wherein the modem module is configured to receive the encapsulated network packets from the media streaming module via the HPI-EMIF bridge, to decapsulate the network packets, and to transmit the decapsulated network packets containing the media stream via at least one of the local area network interface and the wide area network interface.

2. The device of claim 1 wherein the modem module is further configured to form network data packets based upon data received from the at least one of the first and second network interfaces, to encapsulate the network data packets into the interface format that is compatible with the host port interface, and to transmit the encapsulated network data packets to the media streaming module via the dedicated communications channel.

3. The device of claim 1 wherein the media streaming module and the modem module are implemented with a common processing device.

4. The device of claim 1 wherein the modem module is further configured to obtain a network address that was previously allocated to another device operating on the local area network and to use the previously-allocated network address during subsequent communications.

5. A method for transmitting a network stream representing audio/visual signals received from a media source to a second device using a first device that communicates via a first network and a second network and that comprises a media streaming module having a host port interface and a gateway module having an external memory interface that has a direct connection to the host port interface via an HPI-EMIF bridge, and wherein the gateway module, the method comprising:
    receiving the audio/visual signals from the media source;
    processing the audio/visual signals to create the media stream at the media streaming module of the first device, wherein the processing comprises formatting the media stream into network packets that are compatible with at least one of the first network and the second network and encapsulating the network packets into an interface format that is compatible with the HPI-EMIF bridge;
    providing the encapsulated network packets containing the media stream from the media streaming module to the gateway module of the first device via the HPI-EMIF bridge, wherein the gateway module extracts the network packets from the encapsulated network packets; and
    transmitting the extracted network packets containing the media stream to the second device via at least one of the first and the second networks.

6. The method of claim 5 further comprising forming network data packets at the gateway module based upon data received from at least one of the first and second networks, encapsulating the network data packets into the encapsulated packet format at the gateway module, and transmitting the encapsulated data packets from the gateway module to the media streaming module via the HPI-EMIF bridge within the first device.

7. The method of claim 5 further comprising switching a communications channel within the first device between the media streaming module and the gateway module.

8. The method of claim 5 further comprising obtaining a network address that was previously allocated to another device operating on the first network and using the previously-allocated network address during subsequent communications.

9. The method of claim 8 comprising monitoring network traffic on the first network to determine the previously-allocated network address.

10. The method of claim 8 comprising detecting a dynamic host configuration message on the first network to determine the previously-allocated network address.

11. The method of claim 8 wherein the previously-allocated network address comprises an internet protocol (IP) address.

12. The method of claim 8 wherein the previously-allocated network address comprises a media access control (MAC) address.

13. The method of claim 5 further comprising receiving a discovery request from a third device operating on the first network.

14. The method of claim 13 further comprising detecting signals in the second network, setting a first operating mode if signals are received only in the first network, and setting a second operating mode if signals are received in both the first network and the second network.

15. A gateway device interfacing with a local area network and a wide area network that additionally provides a media stream to a remote device in response to audio/visual signals received from a media source, the gateway device comprising:
    a media interface configured to receive the audio/visual signals from the media source;
    a first network interface to the local area network;
    a second network interface to the wide area network;
    an HPI-EMIF bridge configured to provide a dedicated internal communications channel within the gateway device;
    a media streaming module having a host port interface configured to transmit and receive data via the HPI-EMIF bridge, wherein the media streaming module is configured to receive the audio/visual signals from the media interface, to process the audio/visual signals to create the media stream, to format the media stream into network packets compatible with at least one of the local area network and the wide area network, to encapsulate the network packets into encapsulated packets compatible with the HPI-EMIF bridge, and to transmit the encapsulated packets on the HPI-EMIF bridge within the gateway device; and a modem module having an external memory interface configured to transmit and receive data via the HPI-EMIF bridge, wherein the modem module is coupled to the first and second network interfaces and is configured to provide a gateway between the local area network and the wide area network, wherein the modem module is further configured to receive the encapsulated packets from the media streaming module via the HPI-EMIF bridge, to extract the network packets from the encapsulated packets, and to transmit the network packets to the remote device via the at least one of the local area network and the wide area network.

16. The gateway device of claim 15 wherein the modem module is further configured to obtain a network address that was previously allocated to another device operating on the local area network and to use the previously-allocated network address during subsequent communications.

* * * * *